(12) United States Patent
Kalluf et al.

(10) Patent No.: US 7,923,882 B2
(45) Date of Patent: Apr. 12, 2011

(54) SYNCHRONOUS MACHINE AND A PROCESS OF MANUFACTURING A SYNCHRONOUS MACHINE

(75) Inventors: Flavio J. H. Kalluf, Joinville SC (BR); Milton Bruning, Joinville SC (BR)

(73) Assignee: Whirlpool S.A., Sao Paulo (BR)

( * ) Notice: Subject to any disclaimer, the term of this patent is extended or adjusted under 35 U.S.C. 154(b) by 82 days.

(21) Appl. No.: 12/372,427

(22) Filed: Feb. 17, 2009

(65) Prior Publication Data

US 2010/0156228 A1 Jun. 24, 2010

Related U.S. Application Data

(63) Continuation-in-part of application No. PCT/BR2007/000206, filed on Aug. 15, 2007.

(51) Int. Cl.
*H02K 21/12* (2006.01)

(52) U.S. Cl. ............... 310/156.83; 310/211; 310/156.78

(58) Field of Classification Search ............ 310/156.78–156.84, 211, 266
See application file for complete search history.

(56) References Cited

U.S. PATENT DOCUMENTS

| | | | |
|---|---|---|---|
| 4,139,790 A | 2/1979 | Steen | |
| 4,358,697 A * | 11/1982 | Liu et al. | 310/156.84 |
| 4,570,333 A | 2/1986 | Jones | |
| 4,922,152 A * | 5/1990 | Gleghorn et al. | 310/156.84 |
| 5,097,166 A * | 3/1992 | Mikulic | 310/156.83 |
| 5,818,139 A | 10/1998 | Yamagiwa et al. | |
| 6,727,627 B1 * | 4/2004 | Sasaki et al. | 310/211 |
| 7,019,427 B2 * | 3/2006 | Sasaki et al. | 310/156.78 |
| 7,161,270 B2 * | 1/2007 | Han et al. | 310/156.81 |
| 7,619,343 B2 * | 11/2009 | Weihrauch et al. | 310/156.78 |
| 2004/0169431 A1 | 9/2004 | Sasaki et al. | |
| 2005/0077801 A1 * | 4/2005 | Han et al. | 310/266 |

* cited by examiner

*Primary Examiner* — Thanh Lam
(74) *Attorney, Agent, or Firm* — Alston & Bird LLP

(57) ABSTRACT

A synchronous machine and a process for manufacturing a synchronous machine having permanent magnets arranged within the rotor such that the leak of magnetic flux generated by the magnets is reduced and having constructive characteristics that maximize the difference in the reluctances of direct axis and quadrature axis while providing the strength necessary for the good functioning of the equipment. Magnet-fixation grooves of the rotor are provided with elongated ends in a curved shape, a first elongated end extending from the first free end to a region adjacent the end of the rotor groove bottom, the first elongated end being configured from an opening in the rotor, forming reluctance-increase channels, a second elongated end of the fixation grooves being configured so as to form the reluctance-increase channel and extending from the respective second free-end portion toward the second free-end portion of the other fixation groove of the pair.

18 Claims, 6 Drawing Sheets

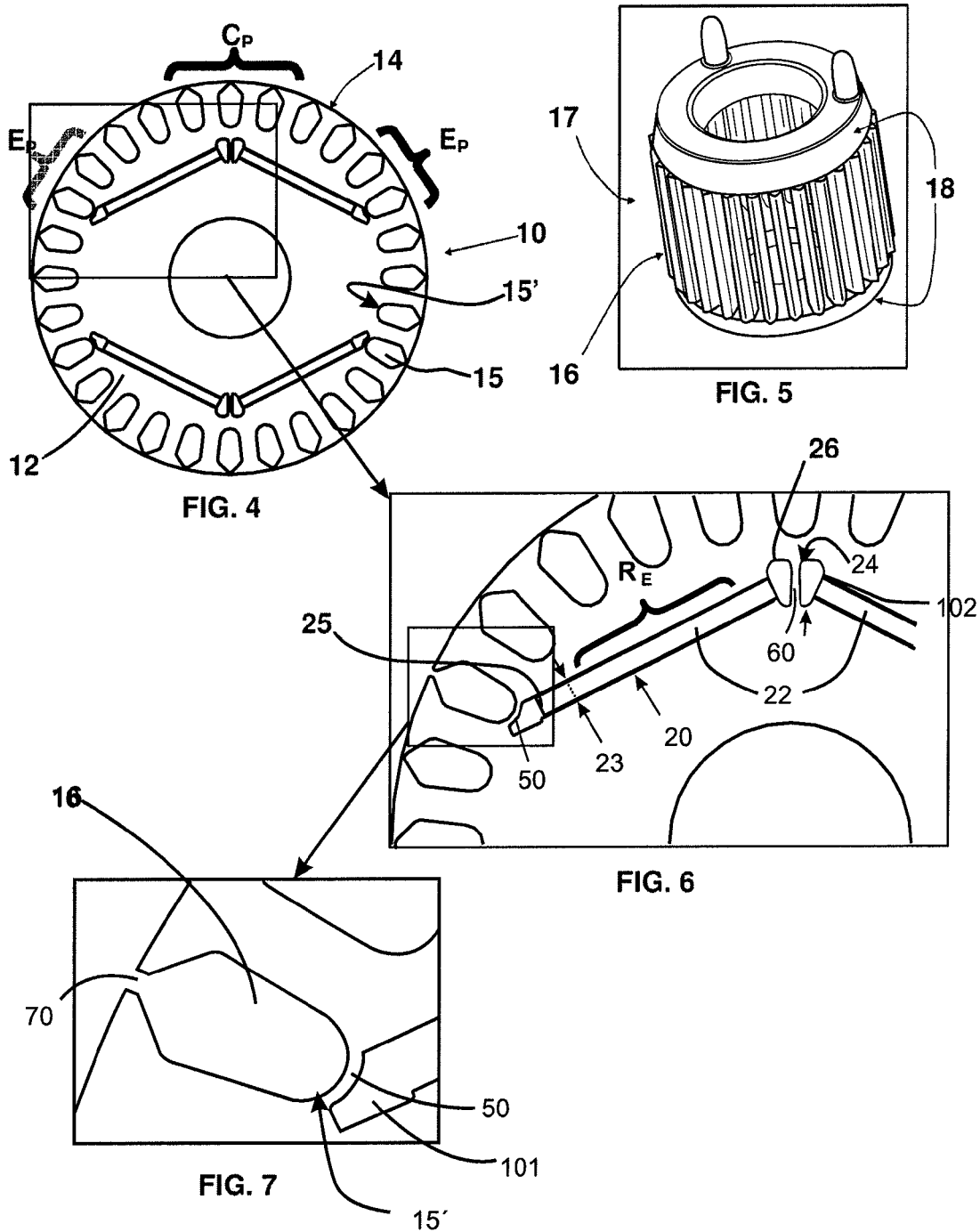

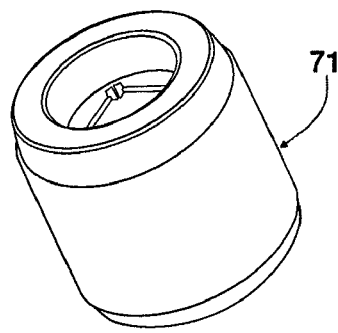
FIG. 10
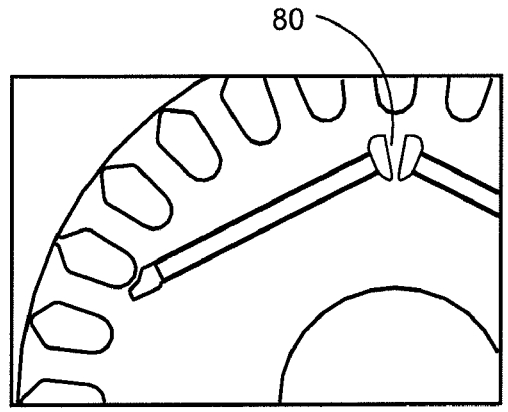
FIG. 11
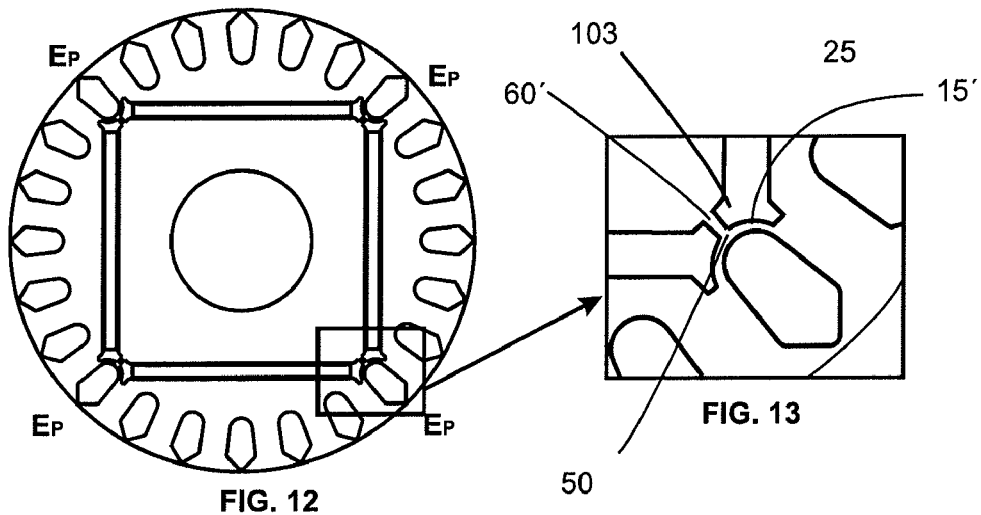
FIG. 12
FIG. 13

SYNCHRONOUS MACHINE AND A PROCESS OF MANUFACTURING A SYNCHRONOUS MACHINE

CROSS-REFERENCE TO RELATED APPLICATION

The present application is a continuation-in-part of International Patent Application No. PCT/BR2007/000206 filed on Aug. 15, 2007 and published under PCT Article 21(2) in the English language, which application is currently pending.

BACKGROUND OF THE INVENTION

The present invention relates to a synchronous machine and to a process of manufacturing a synchronous machine and, more particularly, to a synchronous machine with permanent magnets on the rotor and cage for direct start.

Synchronous machines with permanent magnets are known from the prior art and comprise essentially a stator and a rotor, the rotor being substantially cylindrical in shape, having a surface portion and a rotor nucleus, and the rotor may be provided with a cage positioned on the surface portion, the cage being formed by parallel bars connected at their ends by short-circuit rings. Such a rotor configuration is known as a cage rotor and is useful in the process of starting the machine.

Inside the rotor, one may allocate pairs of permanent magnets in fixation grooves that are positioned longitudinally in the rotor nucleus (or rotor core).

As far as the electric characteristics are concerned, the rotor has a plurality of poles, which varies according to the characteristics and applications of each machine.

The permanent magnets, allocated inside the rotor, have the purpose of generating a machine-magnetization flux.

A common fact found on machines of this type is the flux leak, caused by the magnetic short-circuit of the magnets through the steel bridges formed at the following points: 1) between the grooves for allocation of the magnets of a same pole; 2) between the grooves for allocation of the magnets and the adjacent grooves of the cage 3) between the beak of the rotor grooves and the outer diameter of the rotor. This effect, as well as the flux-loss points can be better understood from FIG. 6, which shows the magnetic flux lines.

In this regard, it would be ideal be to provide the nucleus totally cut longitudinally with magnets, as can be seen in FIG. 9, since in this way there would be no loss of magnetic flux. The situation is only hypothetical, since in this case the rotor would not have the mechanical stability required for the functioning of electric machine.

One of the solutions of the prior art that discloses the use of the application of permanent magnets is described in document U.S. Pat. No. 6,876,119. According to the teachings of this prior art, one describes a synchronous motor having a rotor provided with V-shaped magnets, through the junction of magnets set to each other. Although this solution is good from the magnetic point of view, it may present problems relating to the mechanical stability (rigidity) of the blade packet, due to the large amount of steel removed during the stamping process. This fact, allied with the fact that significant deformations occur on the steel packet during the injection of aluminum, may cause problems of collision of the rotor, which impairs the reliability of the machine.

Such problems require subsequent treatment of the rotor for reducing the collision, such as grinding, machining or a similar process. The same reference further describes the possibility of configuring the grooves close to the end of the magnets with a greater depth, so that they will approach the magnet and prevent a short-circuit of the magnetic flux from a pole to the other on the same magnet.

This solution minimizes the problems of short-circuit of magnetic flux, but makes the construction of the electric machine difficult, since a cage-rotor groove needs to be especially configured and mounted in an specific manner during the process of manufacturing the machine, requiring differentiated stamping tools, which results in complications of practical and economical nature.

Another characteristic of this reference is the fact that is presents similar reluctances on the direct axis and on the quadrature axis. In this way, however, it is not possible to take advantage of the reluctance torques in the working condition, and this occurs for the following reasons:

The torque generated by a synchronous motor can be divided into two components:

(a) synchronous torque: it represents the synchronization torque between the magnet filed and the main spinning filed. It can be calculated by the following formula:

$$T_{sinc} = \frac{p}{2 \cdot \pi \cdot f} \cdot \left( \frac{V_1 \cdot E_f}{X_{sd}} \right) \cdot \sin(\delta) \qquad \text{Eq. 1}$$

wherein:
p=number of poles
f=frequency [Hz]
V1=feed voltage [V]
Ef=EMF induced by the magnets [V]
Xsd=synchronous reactance of direct axis [Ω]
δ=load angle a) Reluctance torque: it appears due to the difference in reluctance between the direct axis and the quadrature axis. It can be calculated by the following formula:

$$T_{rel} = \frac{p \cdot V_1^2}{4 \cdot \pi \cdot f} \cdot \left( \frac{1}{X_{sq}} - \frac{1}{X_{sd}} \right) \cdot \sin(2 \cdot \delta) \qquad \text{Eq. 2}$$

wherein:
Xsd=synchronous quadrature reactance [Ω].

The total torque generated by the motor in synchronous speed is the sum of Tsync+Trel. In this way, one can observe that the direct-axis reluctance and quadrature-axis reluctance have a great influence on the maximum torque value obtained.

More specifically, the influence of each part of torque and its variation as a function of the motor load angle can be better understood if analyzed graphically, as illustrated in FIG. 1. As shown by the equations, different values of direct axis reluctance and quadrature reluctance may lead to different values of maximum torque generated by the motor.

Taking as a basis a 2-pole motor, one can calculate the magnitude of the maximum torque for each of the configurations below, in FIG. 2a, a situation where the magnitude of the direct axis is substantially equal to that of the quadrature axis (Xd≈Xq); in FIG. 2b one illustrates a situation where the magnitude of the direct axis is smaller than that of the quadrature axis (Xd<Xq), and in FIG. 2c one illustrates a construction where the magnitude of the direct axis is greater than that of the quadrature axis (Xd>Xq).

For each of the alternatives, the Xd and Xq values were obtained by analysis of finite elements. By using the equations 1 and 2, one calculates the value of the total torque as a function of the motor load angle, as shown in the graph of FIG. 3. As can be seen in the graph, the maximum torque is greater for the case in which Xd<Xq. Most of the gain is due to the drop in direct-axis synchronous reactance, which increases significantly the value of the loss of the part of synchronous torque.

SUMMARY OF THE INVENTION

In order to overcome problems of the prior art, the present invention has the objective of reducing the short-circuit flux close to the ends of the magnets, as well as around the cage-rotor groove, by using grooves in the rotor specifically sized for raising the reluctance to the passage of short-circuit magnetic flux and thus reduce the losses that occur according to the previous techniques. Besides, dynamics problems (collision of the rotor) that occur in the prior-art machines are overcome, whereby the necessary extent of grinding, machining and so on is diminished.

One of the solutions foresees the application of a synchronous machine that has a fixation groove for the permanent magnet, such a groove being specially sized to be provided with an elongated bridge forming a reluctance-increase channel close to the first free end. The first free end is positioned adjacent one of the groves of the rotor cage, and the elongated bridge is formed between the free end of the fixation groove and the internal end of the cage groove.

The elongated end is configured from an opening in the rotor and extends along the rotor and along the fixation groove. Such a configuration can be achieved by stamping during the manufacture of the blades that form the rotor nucleus, or still by perforation when the rotor is already mounted.

Thus, the magnetic flux that tends to leak at the end portions of the magnet is reduced, since with the opening of the channel within the nucleus the reluctance to the short-circuit magnetic flux of the magnets is raised and the losses are minimized.

Another solution of the present invention is to maintain the magnets within the rotor separated from each other and also to provide a reluctance-increase channel close to the other end of the magnet-fixation channel (or close to the second free end). In this case, since the permanent magnets are provided in pairs, the reluctance-increase channel should be configured so that it will, at the same time: (i) prevent short-circuit of the magnetic flux and (ii) maintain the strength of the rotor at levels sufficient for the characteristics of the electric machine not to be impaired when the rotor is moved.

Further, in order to prevent the magnetic flux from being short-circuited outside the rotor groove, according to the present invention one foresees a surface bridge configured through an opening of the nucleus close to the surface portion and the bottom end of the cage groove (or beak of groove), such a bridge extending along the rotor surface.

Thus, by laying bridges close to the ends of the magnet fixation grooves and opening the bridges between the cage grooves and the end surface of the rotor, it is possible to reduce the short-circuit magnetic flux at the magnet ends, and also to reduce the short-circuit magnetic flux around the cage grooves. At the same time, one manages to maintain the mechanical stability of the rotor.

Another objective of the present invention is to generate on the rotor a significant difference in direct-axis reluctance and quadrature-axis reluctance. This is achieved by taking advantage of the grooves for arranging the magnets and elongated bridges that form reluctance-increase channels, which are arranged so as to make the passage of flux towards the direct axis difficult and to facilitate it in the direction of the quadrature axis. With this solution, it is possible to take advantage of the reluctance torque generated so as to maximize the maximum torque working condition.

An objective of the present invention is to provide a synchronous electric machine having permanent magnets and direct start, wherein the leak of magnetic flux generated by the magnets is reduced and, at the same time, a rotor with strength enough for the good functioning of the machine is obtained. Another objective is to achieve an increase in the relationship of rotor reluctances between the direct axis and the quadrature axis.

Such objectives are achieved by means of a synchronous machine comprising a stator and a rotor, the rotor being substantially cylindrical in shape having a surface portion and a rotor nucleus portion, the rotor being provided with a cage positioned at the surface portion, the cage being formed by conductive bars allocated in cage grooves and rings which interconnect the bars at their ends, the rotor further comprising at least one pair of permanent magnets, the permanent magnets being allocated in magnet-fixation grooves, the magnet-fixation grooves being positioned longitudinally on the nucleus of the rotor, the fixation groove having a substantially rectangular section having an engagement region and a first free-end portion and a second free-end portion, the fixation groove extending along the rotor, the permanent magnet being fixedly associated to the rotor in the engagement region, the fixation groove being positioned in a secant manner with respect to the surface portion of the rotor, the fixation groove having a first elongated end configured so as to create a reluctance-increase channel close to the first free-end portion, the elongated end extending from the first free-end portion to a region adjacent the end of the groove bottom, the first elongated end being configured from an opening in the rotor, the opening extending along the rotor and along the fixation groove, the magnet-fixation grooves having displacement limiters adjacent the first free-end portion and the second free-end portion, the displacement limiters being formed by nucleus portions that extend inside the fixation grooves in a direction parallel to the magnet width.

A further objective of the present invention is achieved by means of a synchronous machine comprising a cage rotor, the rotor having a surface portion and a rotor nucleus, the rotor comprising at least one pair of permanent magnets, the permanent magnets allocated in magnet-fixation grooves, the magnet-fixation grooves being positioned longitudinally on the rotor nucleus, the rotor having poles having a central pole region and two end pole regions, a pair of magnet-fixation grooves being positioned symmetrically, having a substantially rectangular section having an engagement region, a first free-end portion and a second free-end portion, the fixation grooves extending along the rotor and being adjacent to each other, the permanent magnets being fixed associated to the rotor in the engaging region, the fixation groove being positioned in a secant manner with respect to the surface portion of the rotor and extending between one of the end pole region and the central pole region, the magnet-fixation grooves being constructed so as to form a reluctance-increase channel close to the first free end, the reluctance increase channel extending parallel to the bottom of the rotor groove, the reluctance-increase channel following the whole or part of the radius of the groove bottom.

Another objective of the present invention is achieved by means of a process of manufacturing a synchronous machine that has a stamping step to form elongated bridges and reluctance-increase channels close to the ends of the magnet-fixation grooves and a stamping step so as to configure a surface bridge through an opening of the nucleus between the surface portion of the rotor and the outer end of the cage grooves adjacent the magnet-fixation grooves.

BRIEF DESCRIPTION OF THE DRAWINGS

The present invention will now be described in greater detail with reference to embodiments represented in the drawings, wherein:

FIGS. 2a, 2b and 2c illustrate different configurations of 2-pole rotors;

FIG. 4 is a schematic sectional view of the rotor of a synchronous machine according to the teachings of the present invention;

FIG. 5 is a perspective view of the cage of the rotor illustrated in FIG. 4;

FIG. 6 is a schematic sectional view of the rotor of a synchronous machine illustrating in greater detail the reluctance-increase channels according to the teachings of the present invention;

FIG. 7 is a schematic sectional view of the rotor of a synchronous machine illustrating in greater detail the nucleus opening between the surface portion and the outer end of a cage groove according to the teachings of the present invention;

FIG. 10 is a perspective view of the finished rotor illustrated in FIG. 5;

FIG. 11 is a schematic sectional view of the rotor of a synchronous machine showing an alternative shape of the reluctance-increase channel;

FIGS. 12 and 13 illustrate variations of the present invention for 4-pole machines.

DETAILED DESCRIPTION OF THE FIGURES

Figure 1:
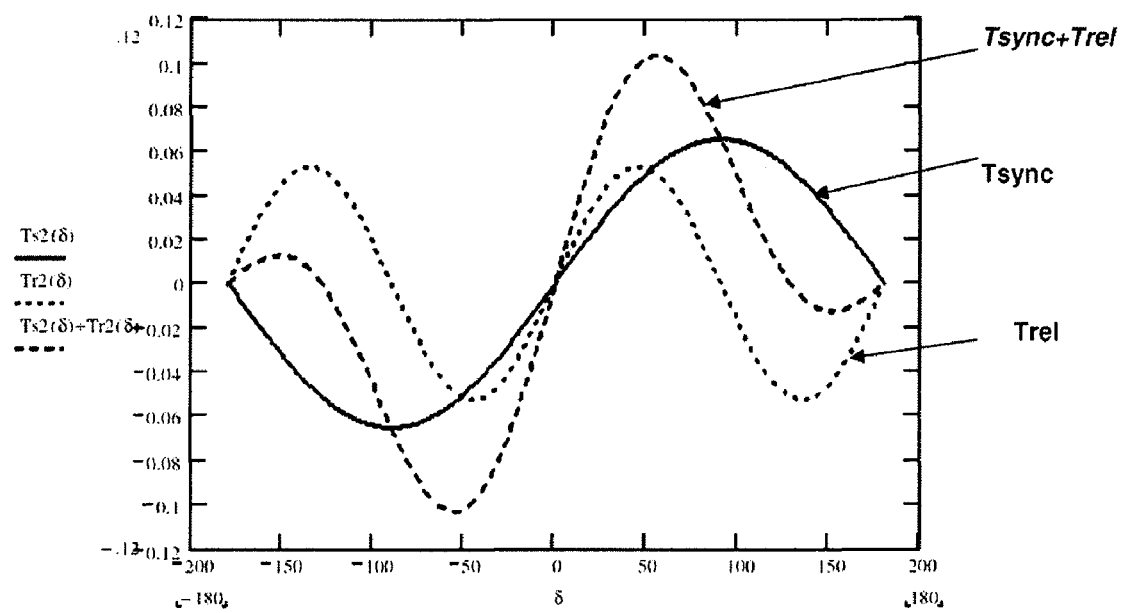
FIG. 1 shows a graph illustrating the influence of each torque part and its variation as a function of the motor load angle.
Figure 2A:
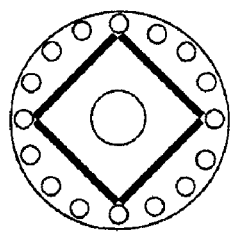
Figure 2B:
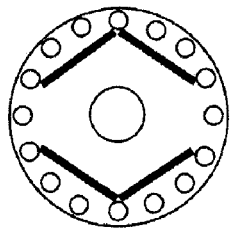
Figure 2B:
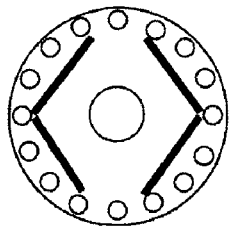
Figure 3:
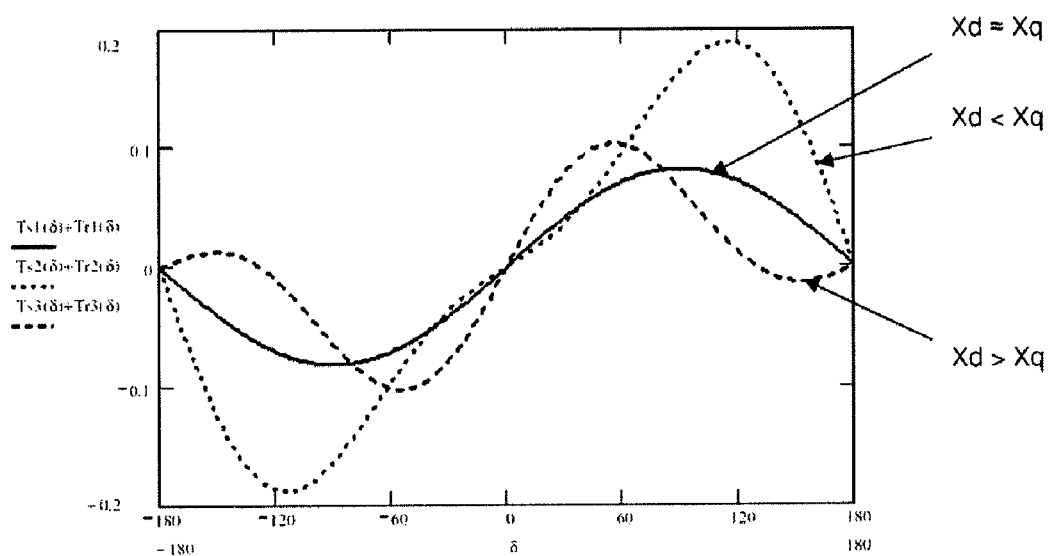
FIG. 3 illustrates a graph where one can observe the maximum torque in the case where Xd<Xq.

As can be seen from FIGS. 4 to 7, the synchronous machine according to the teachings of the present invention comprises a stator (not shown) and a rotor 10.

The rotor 10 is substantially cylindrical in shape and has a surface portion 14 and a rotor nucleus 12, the rotor 10 being provided with grooves 15 provided on the surface portion of the rotor 14, where a cage 17 is allocated, said cage 17 being formed by conductive windings or bars 16 allocated in the grooves 15 and rings 18 that interconnect the bars at their ends. The assembly may receive a finish 71, as can be seen from FIG. 10.

Further as can bee seen in FIGS. 4 to 7, which show an embodiment of a 2-pole rotor, in this embodiment the rotor 10 further comprises at least one pair of permanent magnets 22, which are allocated on magnet-fixation grooves 20, these magnet-fixation grooves 20 being positioned longitudinally on the rotor 10 nucleus. Preferably, the magnet-fixation groove 20 extends along the rotor 10 and has a substantially rectangular section having an engagement region $R_E$ and a first free-end portion 25 and a second free-end portion 26. As can be seen in detail in the figures, each permanent magnet 22 is fixed associated to the rotor 10 in the engagement region $R_E$.

The rotor 10 has poles that extend along a number of cage grooves 16, so that for the sake of explanation in the 2-pole configuration one can divide each pole as having a central pole region $C_P$ and two end pole regions E.

With regard to the positioning of the magnet-fixation grooves 20, they are positioned in a secant manner with respect to the surface portion 14 of the rotor 10 and extend between one of the end pole regions $E_P$ and the central pole region $C_P$, the fixation grooves coming close to the groove bottom (or beak) 15' of the cage grooves 16.

As can be seen in detail in FIG. 6, the fixation groove 22 has a reluctance-increase channel 50 near the first free end 25, the reluctance-increase channel 50 being configured so as to form an elongated bridge, built so as to accompany the whole or at least most of the groove bottom 15' of adjacent rotor. This configuration can be seen in greater detail in FIG. 7.

Preferably, one opts for configuring one of the ends of the magnet-fixation groove so as to form a first elongated end 101, so that it will extend from the first free-end portion 25 to the region adjacent the groove-bottom end 15', so as to obtain a reluctance-increase channel 50 that is as thin as possible. In this way, one preferably opts for configuring the channel walls parallel to the end of the groove bottom 15'.

As can be seen in FIG. 7 and mainly in detail in FIG. 13, the first elongated end 101 for a 2-pole motor and the first elongated end 103 for a four pole motor have a curved or engaging shape which involves substantially the surroundings of the groove-bottom end 15'.

This curved or engaging shape as shown in FIGS. 7 and 13, covers not only the groove-bottom end 15', but also the surrounds of it until a linear region of the groove as shown in the embodiment of FIG. 13. In this case, as already mentioned, the reluctance-increase channel 50 follows the whole or part of the radius of the groove-bottom 15', accompanying, according to this configuration, a groove flux.

Furthermore, as shown in FIG. 7, the first elongated end 101 has a reluctance-increase channel 50 that embraces part of the radius of the groove bottom, thus reducing flux leakage.

The embodiment of the reluctance-increase channel 50 shown in FIG. 13, due its engaging shape follows the whole radius of the groove-bottom 15' thus embracing a major part of the groove-bottom 15'.

Figure 9:
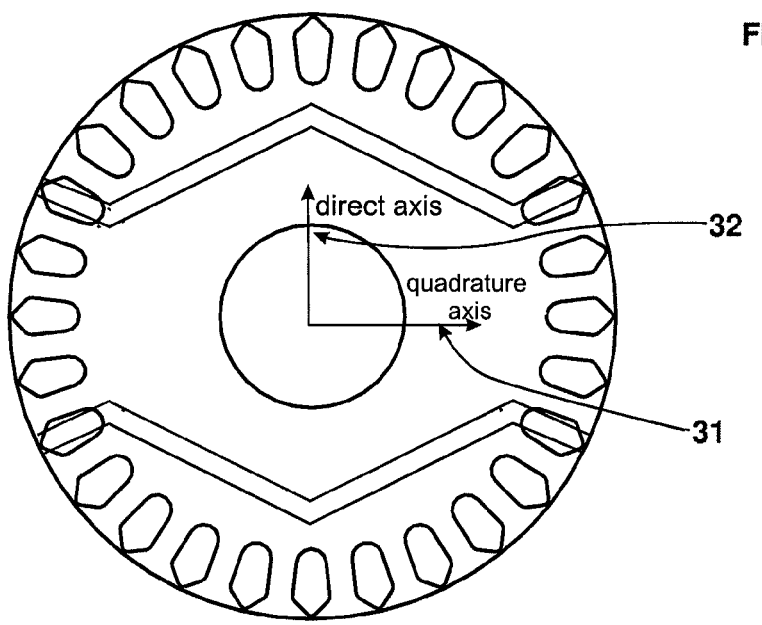
FIG. 9 is a schematic sectional view of the rotor of a synchronous machine illustrating a hypothetical situation of permanent-magnet positioning; the directions of the two direct and quadrature axes are also shown.

Both embodiments of the present invention allow to increase the reluctance of the flux channel and the performance of the motor, when compared to the reluctance channels of the prior art. With these embodiments shown in FIGS. 7 and 13, the present invention result in a construction that is very close to the hypothetical ideal model that is shown in FIG. 9.

A mathematical model of the present invention and its simulation results show that the feature related to the embracing of the part of the radius of the groove bottom offers an improved performance of the motor, since the reluctance torque is increased.

Since the magnet-fixation grooves 20 are position positioned in "V" and are arranged in pairs, each groove of the pair being positioned symmetrically, extending from the end pole regions $E_P$ to the central pole region $C_P$, the fixation groove pair 20 coming close to and adjacent the central pole region $C_P$ and the respective second end portions 26 remaining adjacent each other. In this case, the magnet-fixation groove is configured so as to form a second elongated end 102 forming the reluctance-increase channel 60 extending from the respective second free-end portion 26 towards the second free-end portion 26 of the other fixation groove 20 of the pair, so that this channel will be adjacent the central pole region $C_P$.

As can be seen in FIGS. 6 and 7, each of the permanent magnets 22 has a rectangular cross section having first and second terminations, and between the pair of fixation grooves 20 the second elongated end forming the reluctance-increase channel 60 is configured so as to extend in the radial direction with respect to the geometrical center of the rotor 10, in the direction of a direct axis, so as to form a second elongated end 102 forming a rotor 10 nucleus 12 fillet with an extension 24 in the radial direction that is substantially greater than in the region of the reluctance-increase channel 60 with respect to a width 23 of the magnet-fixation groove 20.

Figure 8:
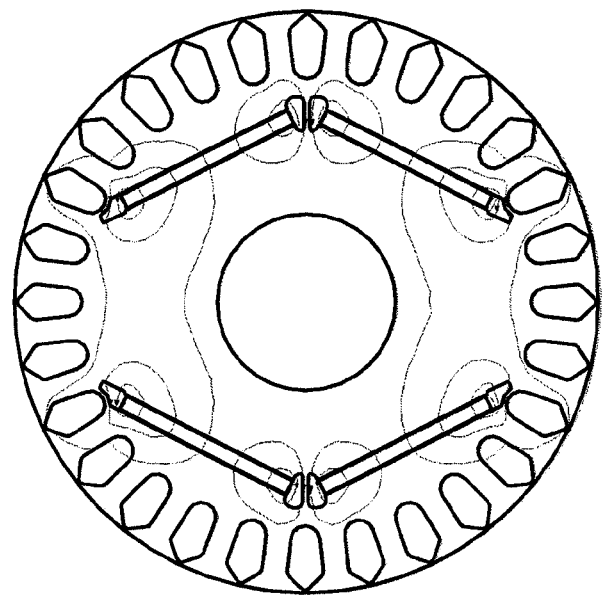
FIG. 8 is a schematic sectional view of the rotor of a synchronous machine constructed according to the prior art, representing flux-leak points.

As can be seen in FIGS. 8 and 11, the reluctance-increase channel, which may be configures so as to have parallel (see reference number 60) or non-parallel (see reference number 80) side edges, both configuration being made so as to meet simultaneously the motor performance restrictions, as well as the respective strength of the rotor 10. In all the cases, one opts for extending the second elongated ends 102 located in the central pole region $C_P$, so that they will be positioned adjacent the other elongated end of the pair and positioned very close to each other.

In addition, in order to prevent the magnetic flux from the permanent magnets 22 from propagating through the tips of the cage grooves 16 close to the free ends of the magnet-fixation grooves 20, these cage grooves 16 are built so as to have a surface bridge 70 configured through an opening of the nucleus 12, this surface bridge 70 being provided between the surface portion 14 of the rotor 10 and the outer end of the cage groove 16 and extending along the surface portion 14 of the rotor 10.

An essential feature of the present invention is related to the use of the surface bridge 70 configured in a particular way, such as shown in FIG. 7, wherein the opening of the nucleus 12 is located radially with regard to its respective reluctance-increase channel 50. FIG. 7 shows the reluctance-increase channel 50 and its correspondent surface bridge 70 in order to avoid the flux leakage.

Moreover, as can be seen in FIG. 6, the surface bridge 70 is applied only radially with regard to its respective reluctance-increase channel and not in all cage grooves such as described in the prior art. The present solution offers an improved mechanical (mechanical stability) and electromagnetic performance, since the surface bridge 70 (opening) is not distributed in all cage grooves, while the flux has being preserved.

The combination of the surface bridge 70 (opening) feature with the reluctance-increase channel, according the teachings of the present invention, allows the synchronous motor achieve a optimized solution when compared to the prior art.

The concepts of the present invention are applicable to any number of rotor poles. One can see in FIGS. 12 and 13 how the application of this concept for the 4-pole rotor configuration would be.

In this embodiment, one can observe that each fixation groove 20 extends between an end pole region $E_P$ to another subsequent end pole region $E_P$, forming a third elongated end 103, which is configured so that the reluctance-increase channel 50 can be configured close to the groove bottom 15', surrounding it parallel to the respective profile, in the same way as in the first embodiment of the present application, that is to say, close to the first free end 25.

Since in the present embodiment the angle between the fixation grooves 20 is of 90°, one can opt for configuring the inner region of the ends of the fixation grooves 100, so that it will have parallel side edges 60' as can be seen in detail from FIG. 13, or non-parallel (not shown), as shown in FIG. 11 that illustrates the other embodiment.

Further, in this configuration one could opt for building a 4-pole machine further having a surface bridge 70 provided between the surface portion 14 of the rotor 10 and the outer end of the cage groove 16 and extending along the surface portion 14 of the rotor 10, just as in the other configuration described. As already mentioned, one should pay attention to the fact that the mechanical stability should be taken into consideration in order to maintain the rotor 10 rigid enough for the design conditions.

In view of the need to build machines with a larger number of poles, it is enough to apply combinations of the configurations described in the two configurations above, using the concept of providing the fixation grooves 20 with elongated bridges that form reluctance-increase channels 50, thereby diminishing the short-circuit of the magnetic flux.

Figure 14:
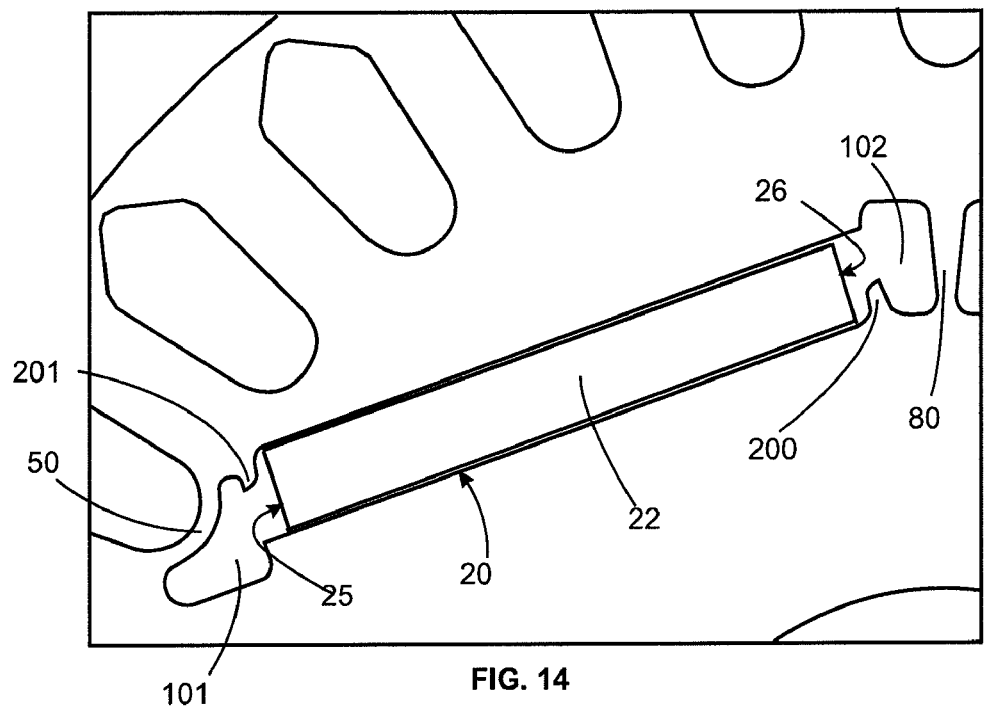
FIGS. 14 and 15 illustrate alternative shapes of the magnet-fixation groove according to the teachings of the present invention.
Figure 15:
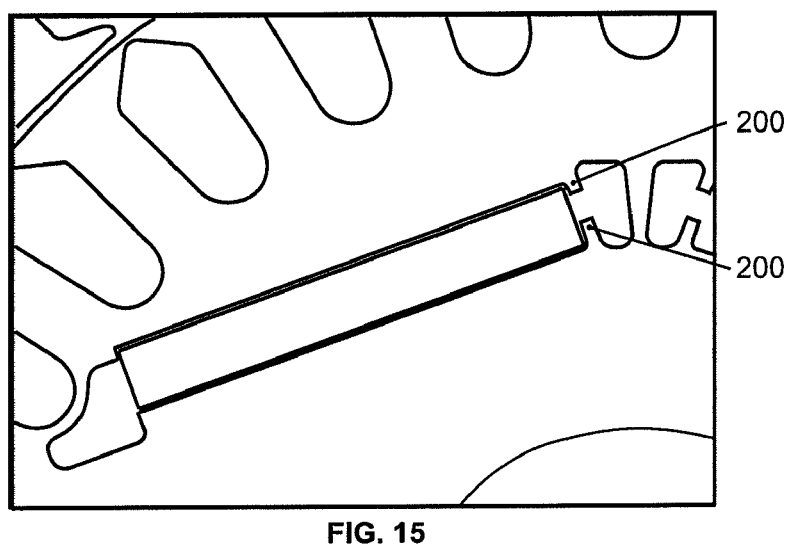

Further on the base of the embodiments suggested in the above-described figures, one also presents design alternatives that bring variations that can facilitate the process of manufacturing the rotor and/or guaranteeing the integrity of the motor during its functioning. One of these embodiments is illustrated in FIGS. 14 and 15, which show alternatives for the shape of the ends of the fixation grooves, which can be used for the purpose of facilitating the manufacture process and preventing the displacement of the magnet 22 during magnetization and/or normal functioning of the machine, the basic principle of these alternative shapes being the use of displacement limiters 200, 201 adjacent the end portions 25, 26 of the magnet, the limiters being formed by nucleus 12 portions that extend inside the magnet-fixation groove 20 in a direction parallel to the magnet thickness, forming protrusions that limits its displacement to the sides. In this magnet fixation form one can opt for the configuration illustrated in FIG. 14, where only one of the sides of the groove has displacement limiters 200, 201.

At each end one may opt for design the limiter coming from one side opposite the groove, or may configure the limiters whenever the came from one side of the groove, or still provided only at one end portions, as can be seen from the configuration illustrated in FIG. 15. The other characteristics of the synchronous machine remain unchanged.

In addition, according to the present invention one provides a process of manufacturing a synchronous machine, which has two stamping steps to form the reluctance-increase channels 50 and 60 near the magnet-fixation grooves, as well as comprises a stamping step for making an opening 70 of the nucleus 12 between the surface portion and the outer end of a cage groove.

More particularly, this type of stamping process is advantageous when compared to the prior art solutions, because it is possible to manufacture the magnetic fixation grooves and the first 101 and second 102 elongated ends during the stamping process, avoiding additional costs related to the use of other materials or elevated development time, such as described in prior art techniques.

Furthermore, as already mentioned, the displacement limiters 200, 201 have been projected on opposite sides, as shown in FIG. 14, in order to maintain the mechanical stability of each magnetic-fixation groove. In addition to that, one can observe that the displacement limiters 200, 201 are positioned at opposite sides of the magnetic poles of the magnet 22.

More specifically, one displacement limiter 200 extends from one side of the pole while the other displacement limiter 201 extends from the opposite side of the pole and also, as already described, the displacement limiters are provided at the opposite sides of the magnet-fixation groove 20 itself.

This is particularly advantageous considering the mechanical forces which the magnet 22 is subjected to during stat-up and also during the magnetization of the synchronous machine as the forces will dislocate the magnet 22 inside the magnet-fixation groove 20, misaligning the magnet 22 not only with respect to the magnet-fixation groove 20 itself but also with respect to the first and second elongated ends 101, 102. The magnetic forces are generated by the electromagnetic field and its interaction as can be seen in FIG. 8, In addition to that, the displacement limiters 200,201, according to the teachings of the present invention are made during the stamping process, such as the first 101 and second 102 elongated ends, in order to help the motor manufacturing which can be done in a much simpler process when compared to the prior art, which uses fixation pins, or the like.

In terms of performance, as mentioned before, and when compared with the prior art, the gains of the present invention are significant. The use of the elongated bridges and of the elongated ands guarantees greater utilization of the flux generated. Thus, in comparative terms a motor built according to the teachings of the prior art has flux utilization ranging from 80 to 85%, whereas with a motor built according to the teachings of the present invention the performance ranges from 85 to 90%.

Finally, the simulation results show that the present solution, related to the use of a surface bridge (70) combined with its respective reluctance-increased channel, provides a better flux distribution, or more precisely, a reduction of the flux losses in a range around 7%.

Other results show that the total useful flux has increased from 73% to 87% according to the approach of the present invention.

Preferred embodiments having been described, one should understand that the scope of the present invention embraces other possible variations, being limited only by the contents of the accompanying claims, which include the possible equivalents.

The invention claimed is:

1. A synchronous machine comprising a stator and a rotor (10), a substantially cylindrical rotor (10) having a surface portion and a rotor nucleus portion (12), the rotor (10) being provided with a cage (16) positioned at the surface portion, the cage (16) being formed by conductive bars allocated in cage grooves (16) and rings (18), which interconnect the bars at their end, the rotor (10) further comprising at least one pair of permanent magnets (22), the permanent magnets (22) being allocated in magnet-fixation grooves (20), the magnet-fixation grooves (20) being positioned longitudinally on the nucleus (12) of the rotor (10), the fixation groove (20) comprising a substantially rectangular section having an engagement region ($R_E$) and a first free-end portion (25) and a second free-end portion (26), the fixation groove (20) extending along the rotor (10), the permanent magnet (22) being fixedly associated to the rotor (10) in the engagement region ($R_E$), the fixation groove (20) being positioned in a secant manner with respect to the surface portion of the rotor (10), the fixation groove (20) having a first elongated end (101) configured so as to create a reluctance-increase channel (50) close to the first free-end portion (25), the elongated end (101) extending from the first free-end portion (25) to a region adjacent the end of the groove bottom (15'), the first elongated end (101) being configured from an opening in the rotor (10), the opening extending along the rotor (10) and along the fixation groove (20), the magnet-fixation grooves (20) having displacement limiters (200, 201) adjacent the first free-end portion (25) and the second free-end portion (26), the displacement limiters being formed by nucleus (12) portions that extend inside the fixation grooves (20) in a direction parallel to the magnet width (23).

2. A synchronous machine according to claim 1, wherein said rotor (10) has poles having a central pole region ($C_P$) and end pole regions ($E_P$), the fixation groove (20) extending between the end pole region ($E_P$) and the central pole region ($C_P$) is provided in pairs and is positioned so that each of the pair grooves will be positioned symmetrically extending from the end pole regions ($E_P$) and the central pole region ($C_P$), the pair of fixation grooves coming close to the central pole region ($C_P$) and remaining adjacent each other, a second elongated end (102) being configured close to the second free-end portion (26) of the fixation groove (20) adjacent the central pole region ($C_P$), so as to enable the formation of the reluctance-increase channel (60, 80).

3. A synchronous machine according to claim 2, wherein said second elongated end (102) is configured so as to form the reluctance-increase channel (60, 80) and extends from the respective free-end portion (26) towards the second free-end portion (26) of the other fixation groove (20) of the pair.

4. A synchronous machine according to claim 1, wherein the first elongated end (101) is configured so as to extend in the direction of the free end of the fixation groove (20), so as to have the end portion parallel to the end of the groove bottom (15').

5. A synchronous machine according to claim 4, wherein the first elongated end (101) is configured so as to accompany the whole or at least a part of the rotor (12) groove bottom (15').

6. A synchronous machine according to claim 3, wherein said reluctance-increase channel is configured so as to extend in the radial direction with reference to the geometric center of the rotor (10), in the direction of a direct axis, so as to form a rotor (10) nucleus (12) rib with an extension (24) in the radial direction substantially greater than the reluctance-increase channel (60) with respect to the width (23) of the magnet-fixation groove (20).

7. A synchronous machine according to claim 6, wherein the reluctance-increase channel (60) has parallel side edges.

8. A synchronous machine according to claim 6, wherein the reluctance-increase channel (80) has non-parallel edges.

9. A synchronous machine according to claim 7, wherein one of the ends (101, 102) adjacent the central pole region ($C_P$) extends towards the other pair, so that the end portions of the fixation grooves will be positioned adjacent each other.

10. A synchronous machine according to claim 9, wherein the elongated end portions remain adjacent and positioned very close to each other.

11. A synchronous machine according to claim 1, wherein said cage grooves close to the first free ends of the fixation grooves (22) of the magnets are provided with a surface bridge (70) configured through an opening of the nucleus (12), the opening being provided between the surface portion (14) of the rotor (10) and the outer end of the cage grooves (16).

12. A synchronous machine according to claim 11, wherein the nucleus (12) opening extends along the rotor (10) surface portion.

13. A synchronous machine according to claim 1, wherein said fixation groove (20) extends between an end pole region ($E_P$) to another subsequent end pole region ($E_P$), the end portions of the magnet-fixation groove (20) being provided with a third elongated end (103), forming reluctance-increase channels (50) that surround the groove bottom (15').

14. A synchronous machine according to claim 13, wherein said third elongated end (103) is configured so as to have parallel side edges (60').

15. A synchronous machine according to claim 1, wherein the displacement limiters 200, 201, are made during a stamping process.

16. A synchronous machine comprising a stator and a rotor, a substantially cylindrical rotor having a surface portion and a rotor nucleus portion, the rotor being provided with a cage positioned at the surface portion, the cage being formed by conductive bars allocated in cage grooves and rings, which interconnect the bars at their end, the rotor further comprising at least one pair of permanent magnets, the permanent magnets being allocated in magnet-fixation grooves, the magnet-fixation grooves being positioned longitudinally on the nucleus of the rotor, the magnetic fixation groove being positioned in a secant manner with respect to the surface portion of the rotor, the fixation groove having a first elongated end configured so as to create a reluctance-increase channel, the first elongated end being configured from an opening in the rotor, the opening extending along the rotor and along the fixation groove, the magnet-fixation grooves having displacement limiters adjacent the first free-end portion and the second free-end portion, the displacement limiters being formed by nucleus portions that extend inside the fixation grooves in a direction parallel to the magnet width, each of the displacement limiters extending from longitudinal opposite sides of the permanent magnet and also, at opposite sides of the magnet-fixation groove 20 itself.

17. A process for manufacturing a synchronous machine as recited in claim 1, wherein the manufacture of a rotor (10) nucleus (12) has stamping steps for forming the first, second and third elongated ends (101, 102, 103) and of the reluctance-increase channels (50, 60, 80) close to these ends.

18. A process according to claim 17, wherein a stamping step to make a surface bridge (70) is configured through an opening in the nucleus (12) between the surface portion (14) of the rotor (10) and the outer end of the cage grooves adjacent the magnet-fixation grooves (20).

* * * * *